(12) United States Patent
Sanchez et al.

(10) Patent No.: US 10,013,620 B1
(45) Date of Patent: Jul. 3, 2018

(54) APPARATUSES, SYSTEMS AND METHODS FOR COMPRESSING IMAGE DATA THAT IS REPRESENTATIVE OF A SERIES OF DIGITAL IMAGES

(71) Applicant: STATE FARM MUTUAL AUTOMOBILE INSURANCE COMPANY, Bloomington, IL (US)

(72) Inventors: Kenneth Jason Sanchez, Bloomington, IL (US); Aaron Scott Chan, Lisle, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 193 days.

(21) Appl. No.: 14/994,310

(22) Filed: Jan. 13, 2016

Related U.S. Application Data

(60) Provisional application No. 62/102,672, filed on Jan. 13, 2015.

(51) Int. Cl.
*G06K 9/00* (2006.01)
*G06K 9/62* (2006.01)
*H04N 19/17* (2014.01)
*H04N 19/423* (2014.01)

(52) U.S. Cl.
CPC ....... *G06K 9/00832* (2013.01); *G06K 9/6202* (2013.01); *H04N 19/17* (2014.11); *H04N 19/423* (2014.11)

(58) Field of Classification Search
CPC ............ G06K 9/6202; G06K 9/00832; H04N 19/423; H04N 19/17
See application file for complete search history.

(56) References Cited

U.S. PATENT DOCUMENTS

| | | | | |
|---|---|---|---|---|
| 5,627,765 | A * | 5/1997 | Robotham | G11B 27/034 348/E5.065 |
| 5,818,535 | A * | 10/1998 | Asnis | H04N 19/503 348/416.1 |
| 7,659,827 | B2 * | 2/2010 | Gunderson | G08G 1/16 340/576 |
| 8,441,548 | B1 * | 5/2013 | Nechyba | H04N 5/228 348/222.1 |
| 8,527,146 | B1 * | 9/2013 | Jackson | B60W 50/0098 180/273 |
| 8,606,492 | B1 * | 12/2013 | Botnen | G07C 5/008 701/123 |
| 8,861,804 | B1 * | 10/2014 | Johnson | G06K 9/00221 382/118 |
| 8,930,072 | B1 * | 1/2015 | Lambert | G07C 5/0866 348/222.1 |
| 9,104,535 | B1 * | 8/2015 | Brinkmann | B60W 40/09 |
| 9,117,246 | B2 * | 8/2015 | McClellan | G06Q 40/08 |
| 9,676,392 | B1 * | 6/2017 | Brinkmann | B60W 40/09 |
| 2003/0154190 | A1 * | 8/2003 | Misawa | G06F 17/30265 |

(Continued)

*Primary Examiner* — Stephen R Koziol
*Assistant Examiner* — Shaghayegh Azima
(74) *Attorney, Agent, or Firm* — Marshall, Gerstein & Borun LLP; Randall G. Rueth (57) ABSTRACT

The present disclosure is directed to apparatuses, systems and methods for automatically compressing digital image data. More particularly, the present disclosure is directed to apparatuses, systems and methods for automatically compressing digital image data that is representative of a series of digital images.

20 Claims, 5 Drawing Sheets

(56) References Cited

U.S. PATENT DOCUMENTS

| | | | | |
|---|---|---|---|---|
| 2004/0247192 | A1* | 12/2004 | Kajiki | H04N 19/176 382/239 |
| 2005/0046584 | A1* | 3/2005 | Breed | B60C 11/24 340/13.31 |
| 2006/0013495 | A1* | 1/2006 | Duan | G06K 9/38 382/235 |
| 2006/0255241 | A1* | 11/2006 | Shibao | G08B 13/19602 250/208.1 |
| 2008/0130998 | A1* | 6/2008 | Maidment | G06F 17/30247 382/181 |
| 2008/0169914 | A1* | 7/2008 | Albertson | B60W 40/09 340/438 |
| 2009/0180697 | A1* | 7/2009 | Erol | G06F 17/30056 382/218 |
| 2010/0205012 | A1* | 8/2010 | McClellan | G06Q 40/08 705/4 |
| 2010/0306373 | A1* | 12/2010 | Wormley | H04L 67/1029 709/224 |
| 2013/0030811 | A1* | 1/2013 | Olleon | B60K 35/00 704/267 |
| 2013/0166098 | A1* | 6/2013 | Lavie | G06F 17/00 701/1 |
| 2013/0314429 | A1* | 11/2013 | Croxford | G06T 1/60 345/531 |
| 2014/0240132 | A1* | 8/2014 | Bychkov | A61B 5/18 340/576 |
| 2014/0322676 | A1* | 10/2014 | Raman | G09B 19/167 434/65 |
| 2014/0375808 | A1* | 12/2014 | Kao | H04N 7/18 348/148 |
| 2015/0095804 | A1* | 4/2015 | Grossman | G06F 3/0482 715/753 |
| 2015/0193885 | A1* | 7/2015 | Akiva | G06Q 40/08 705/4 |
| 2016/0241817 | A1* | 8/2016 | Sun | H04N 5/23293 |
| 2017/0140293 | A1* | 5/2017 | Vij | G06N 7/005 |
| 2017/0227841 | A1* | 8/2017 | Niemela | G02B 27/22 |

* cited by examiner

APPARATUSES, SYSTEMS AND METHODS FOR COMPRESSING IMAGE DATA THAT IS REPRESENTATIVE OF A SERIES OF DIGITAL IMAGES

CROSS REFERENCE TO RELATED APPLICATION

The present application claims benefit of priority, under 35 U.S.C. § 119(b), to U.S. Provisional Patent Application Ser. No.: 62/102,672, entitled METHODS AND SYSTEMS FOR GENERATING DATA REPRESENTATIVE OF VEHICLE IN-CABIN INSURANCE RISK EVALUATIONS, filed Jan. 13, 2015, the disclosure of which is incorporated herein in its entirety by reference.

TECHNICAL FIELD

The present disclosure is directed to apparatuses, systems and methods for automatically compressing digital image data. More particularly, the present disclosure is directed to apparatuses, systems and methods for automatically compressing digital image data that is representative of a series of digital images.

BACKGROUND

Vehicles are being provided with more complex systems. For example, vehicles commonly include a plethora of entertainment systems, such as stereos, USB interfaces for mobile telephones, video players, etc. Vehicles often have a host of other operator interfaces, such as emergency calling systems, vehicle navigation systems, heating and air conditioning systems, interior and exterior lighting controls, air bags, seatbelts, etc.

Vehicle operating environments are becoming more complex as well. For example, some roadways include u-turn lanes, round-a-bouts, no-left turn, multiple lanes one way in the morning and the other way in the afternoon, etc. Increases in traffic are also contributing to increased complexity.

These additional complexities contribute to increases in driver distractions. A great deal of innovation is taking place related to vehicle in-cabin devices for identifying driver distractions, and for reducing driver distractions.

What is needed are apparatuses, systems and methods for automatically compressing digital image data. What is further needed are methods and systems for generating data representative of vehicle in-cabin insurance risk evaluations based on data representative of skeletal diagrams of a driver that are indicative of driver distractions.

SUMMARY

A vehicle in-cabin imaging device for compressing image data that is representative of at least one skeletal diagram of at least one occupant within an associated vehicle may include a processor and a memory. The image data may be stored on the memory, and the image data may be representative of a series of time-stamped digital images. The vehicle in-cabin imaging device may also include an image comparison module stored on the memory, that, when executed by a processor, causes the processor to compare at least two sequential images, of the series of time-stamped digital images, to determine if a threshold change has occurred from a first image to a next image. The vehicle in-cabin imaging device may further include an image data compression module stored on the memory that, when executed by the processor, causes the processor to compress the image data, when the processor determines that a threshold change has not occurred from the first image to the next image, by deleting either first image data associated with the first image, or next image data associated with the next image, from the image data.

In another embodiment, a computer-implemented method for automatically compressing image data that is representative of a series of images of an interior of a vehicle may include an image data receiving module stored on a memory that, when executed by a processor, causes the processor to receive image data. The image data may be representative of a series of time-stamped digital images. The method may also include an image comparison module stored on the memory that, when executed by a processor, causes the processor to compare at least two sequential images, of the series of time-stamped digital images, to determine if a threshold change has occurred from a first image to a next image. The method may further include an image data compression module stored on the memory that, when executed by the processor, causes the processor to compress the image data, when the processor determines that a threshold change has not occurred from the first image to the next image, by deleting either first image data associated with the first image, or next image data associated with the next image, from the image data.

In a further embodiment, a non-transitory computer-readable medium storing computer-readable instruction that, when executed by a processor, cause the processor to automatically compress image data associated with a series of images of an interior of a vehicle may include an image data receiving module that, when executed by a processor, causes the processor to receive image data. The image data may be representative of a series of time-stamped digital images. The non-transitory computer-readable medium may also include an image comparison module that, when executed by a processor, causes the processor to compare at least two sequential images, of the series of time-stamped digital images, to determine if a threshold change has occurred from a first image to a next image. The non-transitory computer-readable medium may further include an image data compression module that, when executed by the processor, causes the processor to compress the image data, when the processor determines that a threshold change has not occurred from the first image to the next image, by deleting either first image data associated with the first image, or next image data associated with the next image, from the image data.

DETAIL DESCRIPTION

Apparatuses, systems and methods for acquiring images of occupants inside a vehicle may include using a vehicle in-cabin device that automatically compresses the associated image data. For example, a vehicle in-cabin device may receive image data representative of a series of digital images. The vehicle in-cabin device may compare sequential images, within the series of digital images, and may time stamp a group of sequential images that are determined to be similar to one another (e.g., a group of sequential images may indicated that very little, if any, changed from one image to a next). Thereby, a sequence of images may be represented by any one image within a correspondingly time-stamped range. Accordingly, associated memory, processing, and related data transmission requirements are reduced compared to previous approaches.

Related methods and systems for generating data representative of vehicle in-cabin insurance risk evaluations may include, for example, the following capabilities: 1) determine whether a vehicle driver is looking at a road (i.e., tracking the driver's face/eyes, with emphasis on differentiating between similar actions, such as a driver who is adjusting a radio while looking at the road versus adjusting the radio while not looking at the road at all); 2) determine whether a driver's hands are empty (e.g., including determining an approximate size/shape of an object in a driver's hands to, for example, differentiate between a cell phone and a large cup, for example); 3) identify a finite number of vehicle occupant postures; and 4) vehicle occupant postures, that are logged, may be rotated and scaled to be normalized for a range of different drivers.

An associated mobile application may accommodate all computer system platforms, such as, iOS, Android and Windows, to connect a vehicle in-cabin device to, for example, a cell phone. In addition, to act as data connection provider to remote servers, the mobile application may provide a user friendly interface for reporting and trouble-shooting vehicle in-cabin device operation.

Figure 1A:
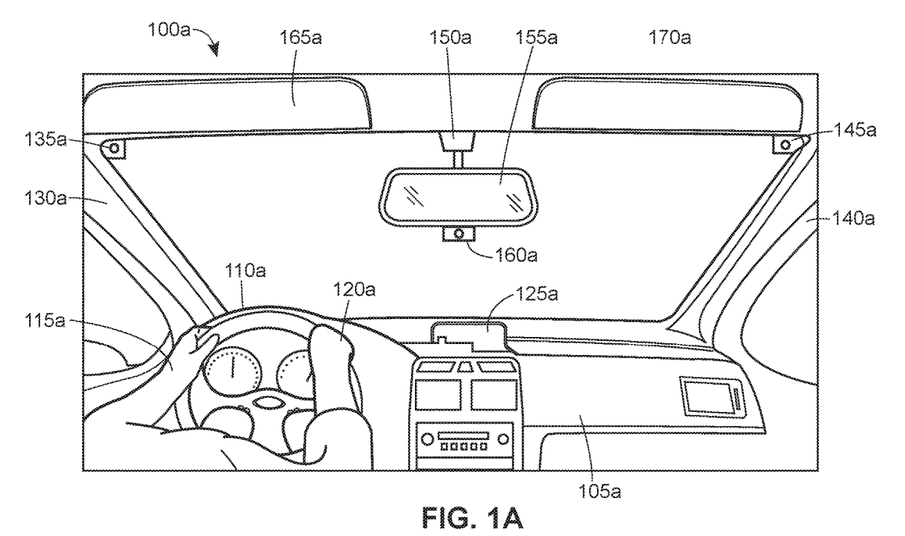
FIGS. 1A-1C depict various views of the interior of an example vehicle that illustrate locations of vehicle operator monitoring devices within the vehicle.
Figure 1B:
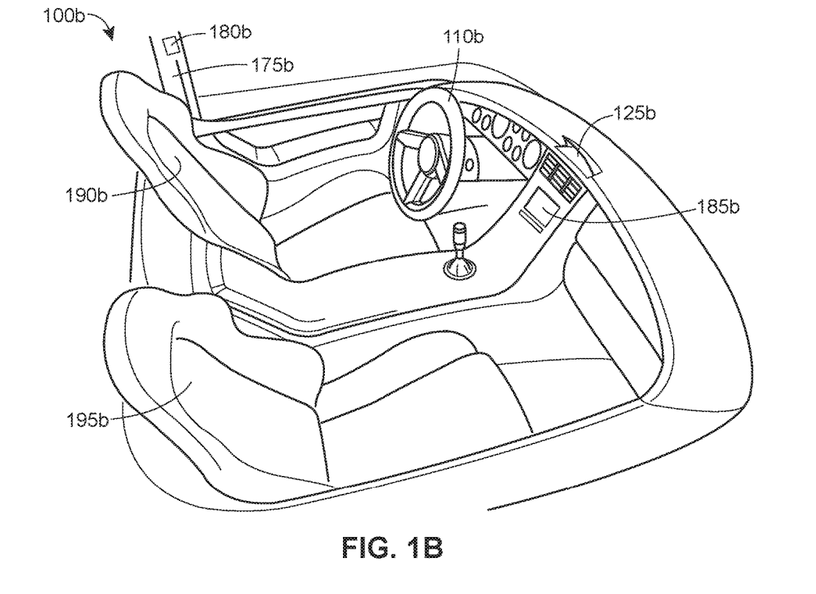
Figure 1C:
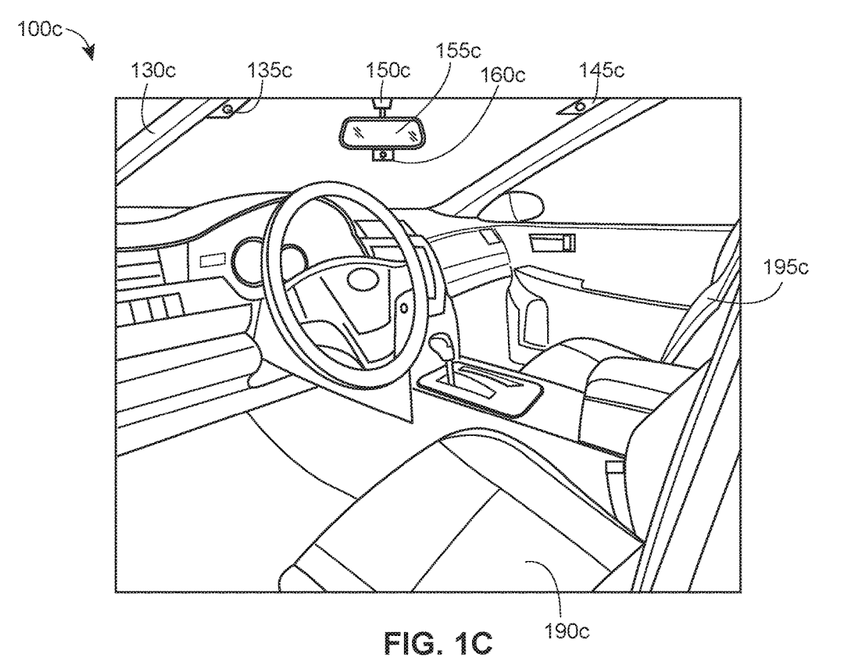

Turning to FIGS. 1A-1C, vehicle interior monitoring systems 100*a*, 100*b*, 100*c* are illustrated. As depicted in FIG. 1A, the vehicle interior monitoring system 100*a* may include a center-dash vehicle in-cabin device position 125*a* located in a center area of a dash 105*a*, a driver-side A-pillar vehicle in-cabin device position 135*a* located in a driver side A-pillar 130*a*, a passenger-side A-pillar vehicle in-cabin device position 145*a* located in a passenger-side A-pillar 140*a* and a rearview mirror vehicle in-cabin device position 160*a* located on a bottom-side of the rearview mirror 155*a*. The vehicle interior monitoring system 100*a* may further, or alternatively, include vehicle in-cabin device positions in a driver-side visor 165*a*, a passenger-side visor 170*a*, a rearview mirror mounting bracket 150*a* and, or the steering wheel 110*a*. As described in detail herein, a position of a left-hand 115*a* of a vehicle driver and, or a position of a right-hand 120*a* of the vehicle driver, relative to, for example, a vehicle steering wheel 110*a* may be determined based on data acquired from any one of the vehicle in-cabin device positions 125*a*, 135*a*, 145*a*, 160*a*. Any one of the vehicle in-cabin device positions 125*a*, 135*a*, 145*a*, 160*a* may be automatically determined based on, for example, an input from an image sensor, an infrared sensor, an ultrasonic sensor, a compass sensor, a GPS sensor, a microphone or any other suitable sensor.

With reference to FIG. 1B, the vehicle monitoring system 100*b* may include a driver-side B-pillar vehicle in-cabin device position 180*b* located in a driver-side B-pillar 175*b* and a center-dash vehicle in-cabin device position 125*b* located in a center area of the dash. While not shown in FIG. 1B, the vehicle monitoring system 100*b* may include a passenger-side B-pillar vehicle in-cabin device position and, or any other vehicle in-cabin device position as described in conjunction with FIG. 1A. The vehicle monitoring system 100*b* may further include a display device 185*b*. The display device 185*b* may be located in, for example, a vehicle in-cabin device located in a center-console area. As illustrated in FIG. 1B, data acquired from the vehicle in-cabin device 125*b*, 180*b* may be used to automatically determine a location of the vehicle in-cabin device, a position of a driver-side seat 190*b*, a passenger-side seat 195*b*, a steering wheel 110*b* and, or at least a portion of a vehicle driver (not shown in FIG. 1B).

Turning to FIG. 1C, the vehicle interior monitoring system 100*c* may include a driver-side A-pillar vehicle in-cabin device position 135*c* located in a driver side A-pillar 130*c*, a passenger-side A-pillar vehicle in-cabin device position 145*c* located in a passenger-side A-pillar 140*c* and a rearview mirror vehicle in-cabin device position 160*c* located on a bottom-side of the rearview mirror 155*c*. The vehicle interior monitoring system 100*c* may further, or alternatively, include vehicle in-cabin device positions in a rearview mirror mounting bracket 150*c* and, or the steering wheel 110*c*. While not shown in FIG. 1C, the vehicle monitoring system 100*c* may include any other vehicle in-cabin device positions as described in conjunction with FIGS. 1A and 1B. As illustrated in FIG. 1C, data acquired from the vehicle in-cabin device position 135*c*, 145*c* may be used to automatically determine a location of the vehicle in-cabin device, a driver-side seat 190*c*, a passenger-side seat 195*c*, a steering wheel 110*c* and, or at least a portion of a vehicle driver (not shown in FIG. 1C).

Figure 2A:
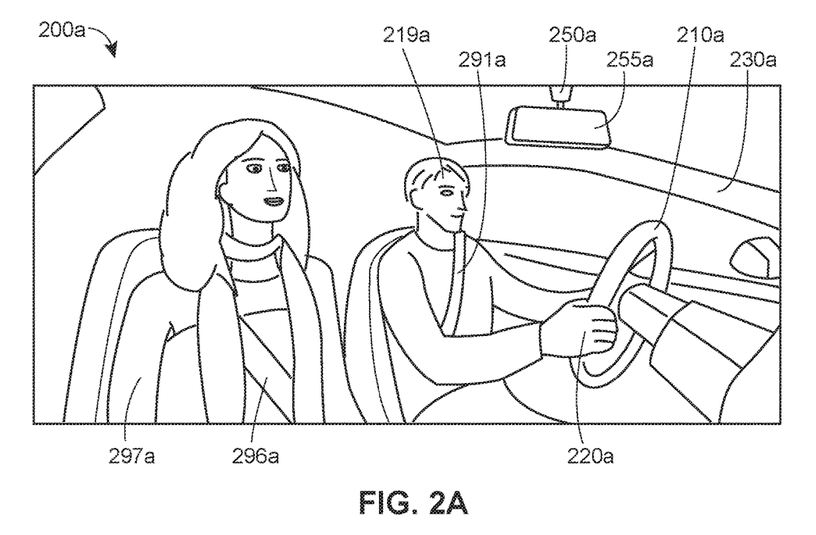
FIGS. 2A-2C illustrate various example images constructed from data retrieved from the vehicle monitoring devices of FIGS. 1A-1C.
Figure 2B:
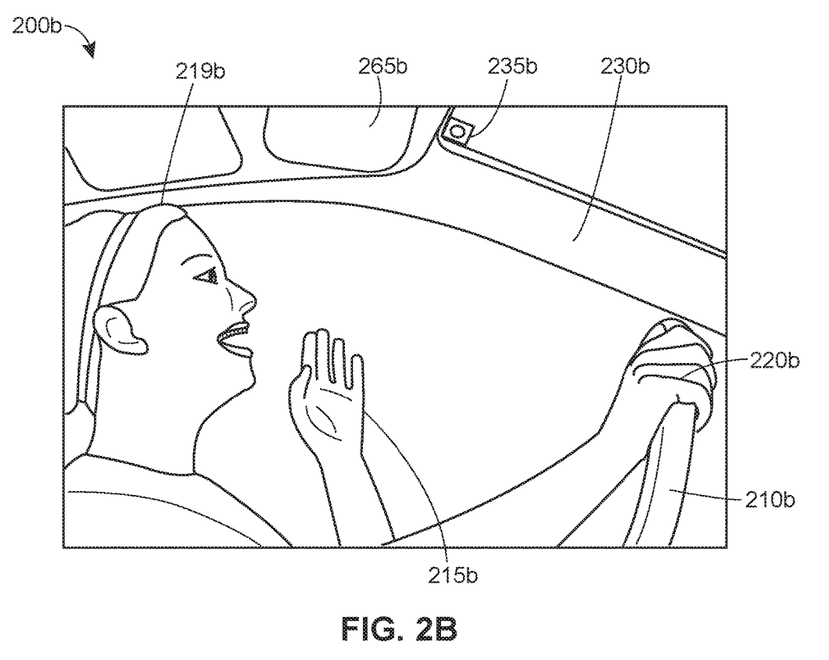
Figure 2C:
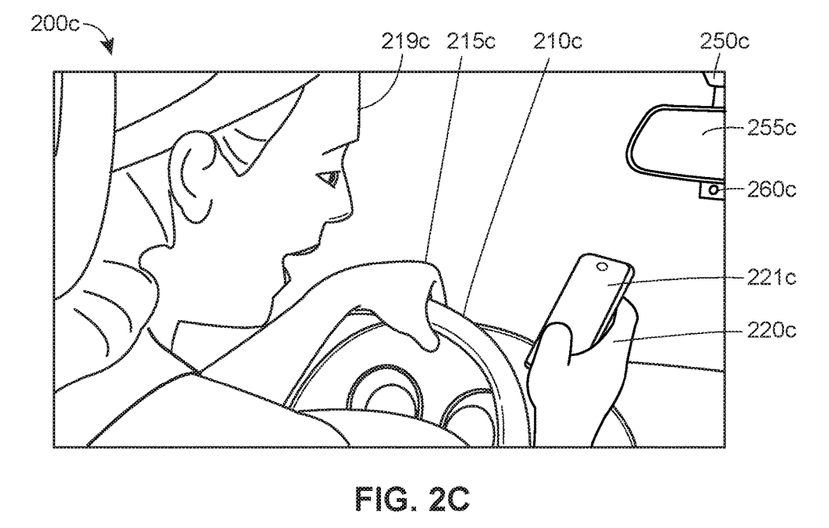

With reference to FIGS. 2A-2C, vehicle interiors 200*a*, 200*b*, 200*c* are depicted. As described in detail herein, data acquired from a vehicle in-cabin device 125*a*, 135*a*, 145*a*, 160*a*, 180*b* of FIGS. 1A and 1B (or any other suitably located vehicle in-cabin device) may be used to determine a position of at least a portion of a passenger 297*a* within the vehicle interior 200*a*. The data acquired from a vehicle in-cabin device 125*a*, 135*a*, 145*a*, 160*a*, 180*b* (or any other suitably located vehicle in-cabin device) may be used to determine whether, or not the passenger 297*a* is wearing a seatbelt 296*a*. As further illustrated in FIG. 2A, data acquired from a vehicle in-cabin device 125*a*, 135*a*, 145*a*, 160*a*, 180*b* of FIGS. 1A and 1B (or any other suitably located vehicle in-cabin device) may be used to determine a position and, or orientation of a vehicle driver's head 219*a* and, or right-hand 220*a* on a steering wheel 210*a*. For example, the data acquired from a vehicle in-cabin device 125*a*, 135*a*, 145*a*, 160*a*, 180*b* may be used to determine whether the vehicle driver's head 219*a* is oriented toward a rearview mirror 255*a*, oriented toward the driver-side A-pillar 230*a* or oriented toward the front windshield. The data acquired from the vehicle in-cabin device 125*a*, 135*a*, 145*a*, 160*a*, 180*b* may be used to determine whether the driver is wearing a seatbelt 291*a*. In any event, the vehicle interior 200*a* may include a vehicle in-cabin device having a microphone 250*a* located proximate the rearview mirror 255*a*. As described in detail herein, data acquired from the microphone 250a may be used to determine a source of sound within the vehicle interior 200a and, or a volume of the sound.

FIG. 2B depicts a vehicle interior 200b including a driver-side A-pillar vehicle in-cabin device position 235b located on a driver-side A-pillar 230b. As described in detail herein, data acquired from the vehicle in-cabin device 235b (along with any other suitably located vehicle in-cabin device 265b) may be used to determine a position and, or orientation of a driver's head 219b, the driver's left hand 215b and, or right hand 220b relative to the steering wheel 210b. For example, data acquired from the vehicle in-cabin device 235b (along with any other suitably located vehicle in-cabin device) may be used to determine a gesture that the driver is performing with her left hand 215b.

Turning to FIG. 2C, a vehicle interior 200b depicts a vehicle in-cabin device 260c located on a bottom side of a rearview mirror 255c opposite a rearview mirror mount 250c. As described in detail herein, data acquired from the vehicle in-cabin device 260c (along with any other suitably located vehicle in-cabin device) may be used to determine a position and, or orientation of a driver's head 219c, the driver's left hand 215c and, or right hand 220c relative to the steering wheel 210c. For example, data acquired from the vehicle in-cabin device 260c (along with any other suitably located vehicle in-cabin device) may be used to determine that the driver's head 219c is oriented toward a cellular telephone 221c in her right hand 220c. As also described in detail herein, a determination may be made that the driver is inattentive to the road based on the driver's head 219c being oriented toward the cellular telephone 221c.

Figure 3:
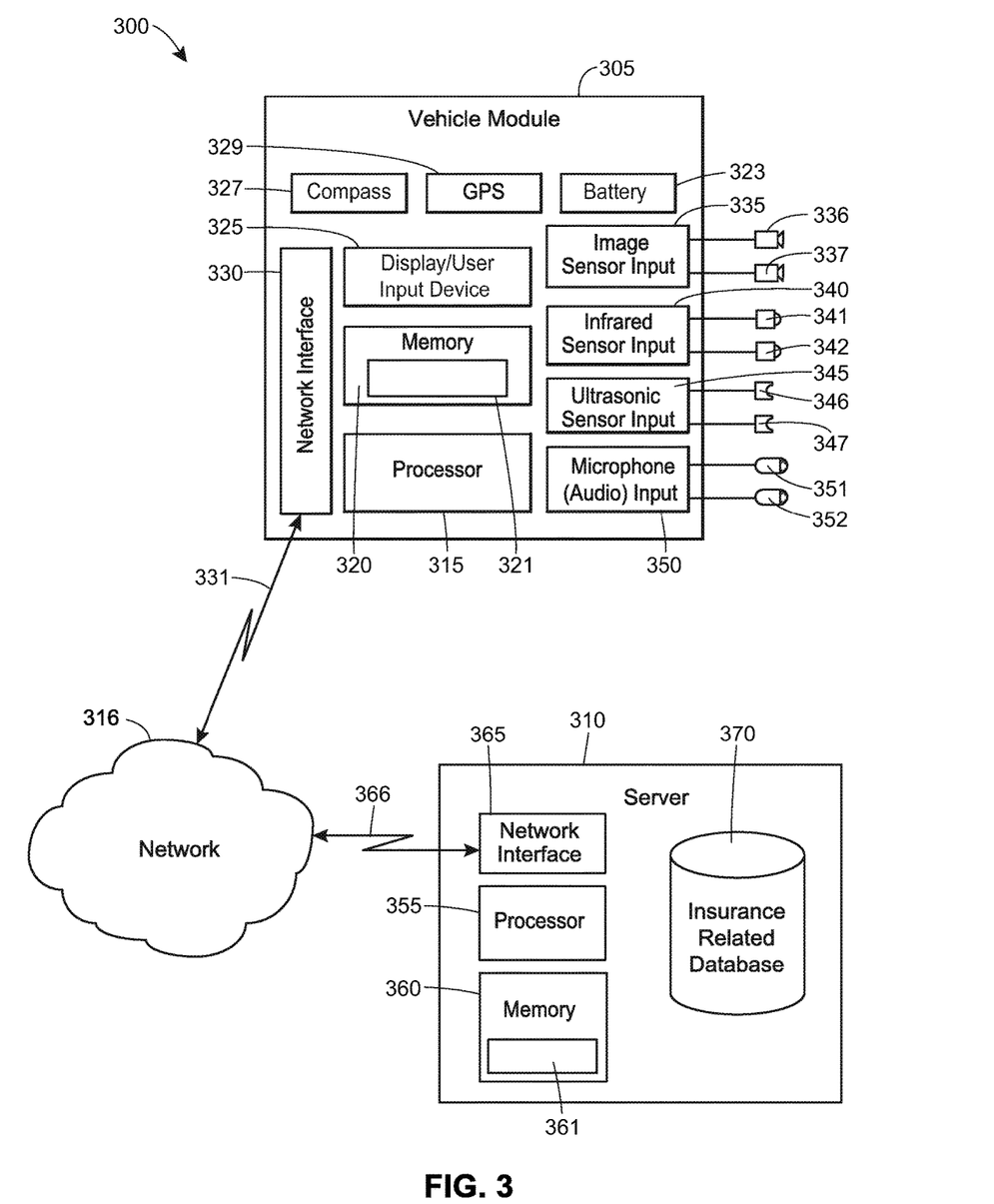
FIG. 3 illustrates a block diagram of a computer network, a computer server and an on-board vehicle computer on which an exemplary vehicle occupant monitoring system and method may operate in accordance with the described embodiments.

With reference to FIG. 3, a high-level block diagram of vehicle in-cabin system 300 is illustrated that may implement communications between a vehicle in-cabin device 305 and a remote computing device 310 (e.g., a remote server) to provide vehicle in-cabin device 305 location and/or orientation data, and vehicle interior occupant position data to, for example, an insurance related database 370. The vehicle in-cabin system 300 may acquire data from a vehicle in-cabin device (e.g., position sensors within a vehicle in-cabin device 125a, 135a, 145a, 160a, 180b of FIGS. 1A and 1B) and generate three dimensional (3D) models of vehicle interiors and occupants as depicted in FIGS. 2A-2C. The vehicle in-cabin system 300 may also acquire data from a microphone (e.g., microphone 250a of FIG. 2A) and determine a source of sound and volume of sound within a vehicle interior.

For clarity, only one vehicle in-cabin device 305 is depicted in FIG. 3. While FIG. 3 depicts only one vehicle in-cabin device 305, it should be understood that any number of vehicle in-cabin devices 305 may be supported. The vehicle in-cabin device 305 may include a memory 320 and a processor 315 for storing and executing, respectively, a module 321. The module 321, stored in the memory 320 as a set of computer-readable instructions, may be related to a vehicle interior and occupant position data collecting application that, when executed on the processor 315, causes vehicle in-cabin device location data to be stored in the memory 320. Execution of the module 321 may also cause the processor 315 to generate at least one 3D model of at least a portion of a vehicle occupant (e.g., a driver and/or passenger) within the vehicle interior. Execution of the module 321 may further cause the processor 315 to associate the vehicle in-cabin device location data with a time and, or date. Execution of the module 321 may further cause the processor 315 to communicate with the processor 355 of the remote computing device 310 via the network interface 330, the vehicle in-cabin device communications network connection 331 and the wireless communication network 316.

The vehicle in-cabin device 305 may also include a compass sensor 327, a global positioning system (GPS) sensor 329, and a battery 323. The vehicle in-cabin device 305 may further include an image sensor input 335 communicatively connected to, for example, a first image sensor 336 and a second image sensor 337. While two image sensors 336, 337 are depicted in FIG. 3, any number of image sensors may be included within a vehicle interior monitoring system and may be located within a vehicle interior as depicted in FIGS. 1A-1C. The vehicle in-cabin device 305 may also include an infrared sensor input 340 communicatively connected to a first infrared sensor 341 and a second infrared sensor 342. While two infrared sensors 341, 342 are depicted in FIG. 3, any number of infrared sensors may be included within a vehicle interior monitoring system and may be located within a vehicle interior as depicted in FIGS. 1A-1C. The vehicle in-cabin device 305 may further include an ultrasonic sensor input 345 communicatively connected to a first ultrasonic sensor 346 and a second ultrasonic sensor 347. While two ultrasonic sensors 346, 347 are depicted in FIG. 3, any number of ultrasonic sensors may be included within a vehicle interior monitoring system and may be located within a vehicle interior as depicted in FIGS. 1A-1C. The vehicle in-cabin device 305 may also include a microphone input 350 communicatively connected to a first microphone 351 and a second microphone 352. While two microphones 351, 352 are depicted in FIG. 3, any number of microphones may be included within a vehicle interior monitoring system and may be located within a vehicle interior as depicted in FIGS. 1A-1C. The vehicle in-cabin device 305 may further include a display/user input device 325.

As one example, a first image sensor 336 may be located in a driver-side A-pillar (e.g., location of position sensor 135a of FIG. 1A), a second image sensor 337 may be located in a passenger-side A-pillar (e.g., location of position sensor 145a of FIG. 1A), a first infrared sensor 341 may be located in a driver-side B-pillar (e.g., location of position sensor 180b of FIG. 1B), a second infrared sensor 342 may be located in a passenger-side B-pillar (not shown in the Figs.), first and second ultrasonic sensors 346, 347 may be located in a center portion of a vehicle dash (e.g., location of position sensor 125a of FIG. 1A) and first and second microphones 351, 352 may be located on a bottom portion of a vehicle interior rearview mirror (e.g., location of position sensor 160a of FIG. 1A). The processor 315 may acquire position data from any one of, or all of, these sensors 336, 337, 341, 342, 346, 347, 351, 352 and generate at least one 3D model (e.g., a 3D model of at least a portion of a vehicle driver) based on the position data. The processor 315 may transmit data representative of at least one 3D model to the remote computing device 310. Alternatively, the processor 315 may transmit the position data to the remote computing device 310 and the processor 355 may generate at least one 3D model based on the position data. In either event, the processor 315 or the processor 355 may retrieve data representative of a 3D model of a vehicle operator, and may compare the data representative of the 3D model of at least a portion of the vehicle driver with data representative of at least a portion of the 3D model vehicle operator. The processor 315 and, or the processor 355 may generate a vehicle driver warning based on the comparison of the data representative of the 3D model of at least a portion of the vehicle driver with data representative of at least a portion of the 3D model vehicle operator to warn the vehicle operator that his position is indicative of inattentiveness. Alternatively, the processor 315 and/or the processor 355 may generate an advisory based on the comparison of the data representative of the 3D model of at least a portion of the vehicle driver with data representative of at least a portion of the 3D model of a vehicle operator to advise the vehicle operator how to correct her position to improve attentiveness.

The network interface 330 may be configured to facilitate communications between the vehicle in-cabin device 305 and the remote computing device 310 via any hardwired or wireless communication network 316, including for example a wireless LAN, MAN or WAN, WiFi, the Internet, or any combination thereof. Moreover, the vehicle in-cabin device 305 may be communicatively connected to the remote computing device 310 via any suitable communication system, such as via any publicly available or privately owned communication network, including those that use wireless communication structures, such as wireless communication networks, including for example, wireless LANs and WANs, satellite and cellular telephone communication systems, etc. The vehicle in-cabin device 305 may cause insurance risk related data to be stored in a remote computing device 310 memory 360 and/or a remote insurance related database 370.

The remote computing device 310 may include a memory 360 and a processor 355 for storing and executing, respectively, a module 361. The module 361, stored in the memory 360 as a set of computer-readable instructions, facilitates applications related to determining a vehicle in-cabin device location and/or collecting insurance risk related data. The module 361 may also facilitate communications between the computing device 310 and the vehicle in-cabin device 305 via a network interface 365, a remote computing device network connection 366 and the network 316 and other functions and instructions.

The computing device 310 may be communicatively coupled to an insurance related database 370. While the insurance related database 370 is shown in FIG. 3 as being communicatively coupled to the remote computing device 310, it should be understood that the insurance related database 370 may be located within separate remote servers (or any other suitable computing devices) communicatively coupled to the remote computing device 310. Optionally, portions of insurance related database 370 may be associated with memory modules that are separate from one another, such as a memory 320 of the vehicle in-cabin device 305.

Figure 4:
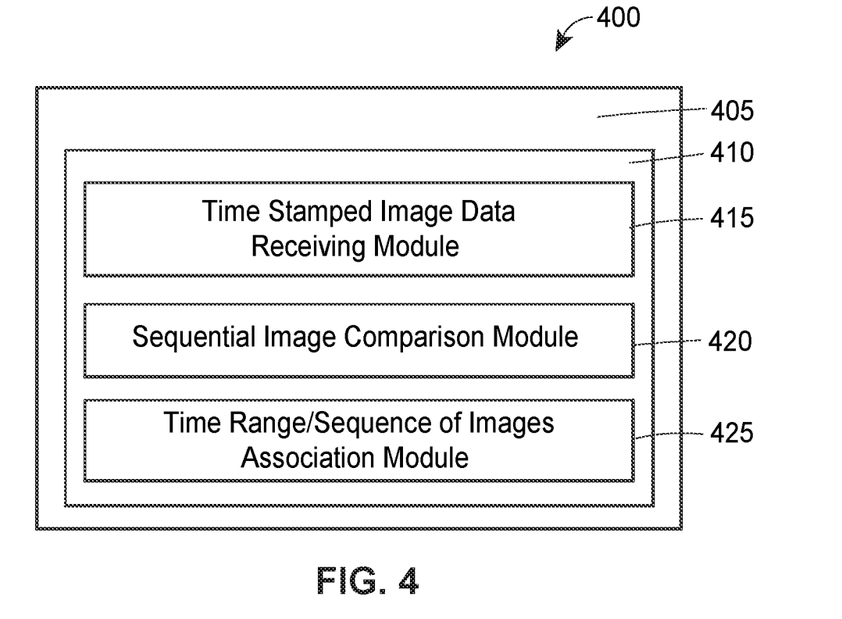
FIG. 4 illustrates a block diagram of an exemplary vehicle in-cabin imaging device for use in acquiring, analyzing, compressing, and transmitting images of a vehicle interior.
Figure 5:
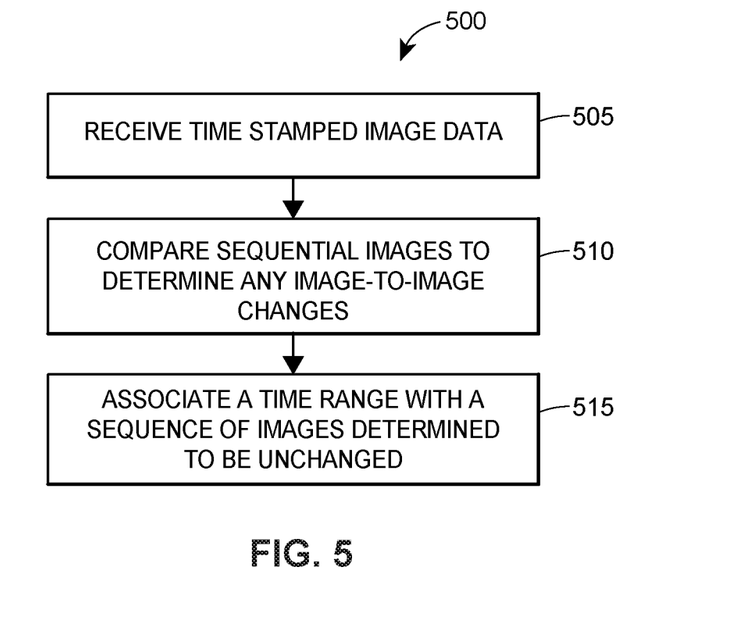
FIG. 5 depicts a flow diagram of an example method of acquiring, analyzing, compressing, and transmitting images of a vehicle interior.

Turning to FIGS. 4 and 5, a vehicle in-cabin device 405 of a vehicle in-cabin device data collection system 400 is depicted along with method 500 of automatically compressing digital image data, that may be representative of images of a vehicle interior and, or transmitting related data to a remote server 310. The vehicle in-cabin device 405 may be similar to the vehicle in-cabin device with insurance application 305 of FIG. 3. The method 500 may be implemented by executing the modules 415-425 on a processor (e.g., processor 315).

In any event, the vehicle in-cabin device 405 may include a previously classified image data receiving module 415, a current image data receiving module 420, and a current image classification module 425 stored in a memory 420. The modules 415-425 may be stored in the memory 410 as a set of computer-readable instructions that, when executed by the processor 315, may cause the processor 315 to automatically classify images of an interior of a vehicle.

The processor 315 may execute the time stamped image data receiving module 415 to, for example, cause the processor 315 to receive time stamped image data (block 505). The time stamped image data may be, for example, representative of a series of images of an interior of a vehicle. The processor 315 may receive current image data from, for example, at least one of a compass sensor 327, a GPS sensor 329, an image sensor 336, 337, an infrared sensor 341, 342, an ultrasonic sensor 346, 347, and/or a microphone 351, 352. The current image data may be representative of images, and/or features (e.g., a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, a vehicle seat location/orientation, etc.) extracted from a respective image, of an interior of a vehicle. In any event, each image may be associated with a particular day and/or time of day.

The processor 315 may execute the sequential image comparison module 420 to, for example, cause the processor 315 compare sequential images (block 510). For example, the processor 315 may compare sequential images to determine if a threshold change has occurred from one image to a next image within the sequence of images. The threshold change may be, for example, based on a number of pixels that have changed between a first image and a next image.

The processor 315 may execute the time range/sequence of images association module 425 to, for example, cause the processor 315 to associate a sequence of images (block 515). For example, the processor 315 may associate a sequence of images that have been determined to not have changed from one image to the next (block 510). Thereby, a sequence of images may be represented by any given image within the sequence, and a time range may be associated with the representative image.

As a particular example, if the processor 315 compares a sequence of five images and determines that little, or no, change has occurred from a first image to the fifth image, the sequence of images may be represented by any given one of the five images. Accordingly, memory, processing, and transmission requirements may be reduced by a factor of five. It should be understood that any number of sequential images may be determined to not have changed.

A car-sharing insurance product could more specifically insure the driver, regardless of the car. Traditional underwriting looks at the driver-vehicle combination. For example, car-sharing may allow an insurance company to more heavily weight the risk of the driver alone. The methods and systems of the present disclosure may allow car-sharing to get that risk information on the driver and carry it forward to whatever car they use. This would be tailored for that particular driver's behavior, rather than demographic and vehicle-use factors. This may allow certain car-sharing entities to have a cost advantage. If the car-sharing entities are paying less insurance, or more specific insurance, the car-sharing entities could pass those savings to their customers and have a retention strategy.

The methods and systems of the present disclosure may allow for emergency responders by, for example, using gesture recognition systems from an aftermarket/insurance device in order to provide an estimate to first responders about the severity of the crash and what kinds of resources/equipment/expertise is required in order to extricate. Using the gesture recognition systems from an aftermarket/insurance device in order to provide an estimate to first responders about the severity of the crash and what kinds of resources/equipment/expertise is required in order to triage—have some idea of what emergency medical needs could be upon arrival. Since the "golden hour" is so critical, and it's not always known how much of that hour has already expired, even a preliminary or broad clue could be helpful in the triage process. The aftermarket gesture recognition device is already operating at the time of the crash. It is collecting data about the driver's position/posture and the location of the arms relative to the body and structures in the vehicle (i.e. the steering wheel). Accelerometers in the device are able to recognize that a crash has occurred (if a pre-determined acceleration threshold has been reached). Upon crash detection the device could transmit via the driver's phone (which is already connected via Bluetooth) or perhaps transmit using an onboard transmitter that uses emergency frequencies (and therefore does not require consumer to pay for data fees). Using gesture recognition from any original equipment or aftermarket gesture tracking device, whether or not for insurance purposes.

The methods and systems of the present disclosure may allow for Transition from Automated to Manual Driving Mode in the case of vehicle automation systems operating the piloting functions with the human in a supervisory role. For example, the vehicle may encounter a situation where control may need to be transferred to the driver, but the driver may or may not be ready to resume control. The methods and systems of the present disclosure may allow gesture recognition systems, or any gesture recognition system, to be used to determine if the driver is ready to resume control. If he/she is not ready, then get his/her attention quickly. The gesture recognition would be used to ascertain whether the driver is ready to resume control by evaluating the driver's posture, the location of hands, the orientation of head, body language. Use machine learning to evaluate driver engagement/attention/readiness-to-engage based on those variables. The gesture recognition could be any original in-vehicle equipment or aftermarket device.

The methods and systems of the present disclosure may distinguish between Automated and Manual driving modalities for variable insurance rating for a scenario where there are many vehicles that are capable of automatically operating the piloting functions, and are capable of the driver manually operating the piloting functions. The driver can elect to switch between automated and manual driving modes at any point during a drive. Gesture recognition would be utilized to distinguish whether a driver is operating the vehicle manually, or whether the vehicle is operating automatically. This could be determined through either OEM or aftermarket hardware. The sensors and software algorithms are able to differentiate between automatic and manual driving based on hand movements, head movements, body posture, eye movements. It can distinguish between the driver making hand contact with the steering wheel (to show that he/she is supervising) while acting as a supervisor, versus the driver providing steering input for piloting purposes. Depending on who/what is operating the vehicle would determine what real-time insurance rates the customer is charged.

The methods and systems of the present disclosure may provide a tool for measuring driver distraction where gesture recognition may be used to identify, distinguish and quantify driver distracted for safety evaluation of vehicle automation systems. This would be used to define metrics and evaluate safety risk for the vehicle human-machine interface as a whole, or individual systems in the case where vehicles have automation and vehicle-to-vehicle/vehicle-to-infrastructure communication capabilities. With Vehicle automation: the vehicle is capable of performing piloting functions without driver input. With Vehicle-to-vehicle/vehicle-to-infrastructure communication incorporated, the vehicle may be capable of communicating data about the first vehicle dynamics or environmental traffic/weather conditions around the first vehicle. For any entity looking to evaluate the safety or risk presented by a vehicle with automated driving capabilities, gesture recognition could be useful to quantify risk presented by driver distraction resulting from any vehicle system in the cabin (i.e. an entertainment system, a feature that automates one or more functions of piloting, a convenience system). With the rise of vehicle automation systems and capabilities, tools will be needed to evaluate the safety of individual systems in the car, or the car as a whole. Much uncertainty remains about how these systems will be used by drivers (especially those who are not from the community of automotive engineering or automotive safety). Determining whether they create a net benefit to drivers is a big question. The methods and systems of the present disclosure may allow gesture recognition to be used to identify the presence of distracted driving behaviors that are correlated with the presence of vehicle automation capabilities. The distraction could be quantified by duration that the driver engages in certain behaviors. Risk quantification may also be measured by weighting certain behaviors with higher severity than other behaviors, so the duration times are weighted. Risk quantification may also differentiate subcategories of behaviors based on degree of motion of hands, head, eyes, body. For example, the methods and systems of the present disclosure may distinguish texting with the phone on the steering wheel from texting with the phone in the driver's lap requiring frequent glances up and down. The latter would be quantified with greater risk in terms of severity of distraction. The purpose of this risk evaluation could be for reasons including but not limited to adhering to vehicle regulations, providing information to the general public, vehicle design testing or insurance purposes.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:
1. A vehicle in-cabin imaging device for compressing image data that is representative of at least one skeletal diagram of at least one occupant within an associated vehicle, the vehicle in-cabin imaging device comprising:
  a processor and a memory, wherein image data is stored on the memory, wherein the image data is representative of a series of time-stamped digital images;
  a vehicle interior device data module stored on the memory that, when executed by the processor, causes the processor to receive at least one of: location data or orientation data from at least one vehicle in-cabin imaging device sensor, wherein the location data is indicative of a location of the vehicle in-cabin imaging device relative to the vehicle occupant within the series of time-stamped digital images and the orientation data is indicative of an orientation of the vehicle in-cabin imaging device relative to the vehicle occupant within the series of time-stamped digital images, and wherein the processor determines at least one of: a location of the vehicle in-cabin imaging device based on the location data irrespective of a current location of the vehicle in-cabin imaging device within the vehicle interior or an orientation of the vehicle in-cabin imaging device based on the orientation data irrespective of a current orientation of the vehicle in-cabin imaging device within the vehicle interior;

an image comparison module stored on the memory that, when executed by the processor, causes the processor to compare at least two sequential images, of the series of time-stamped digital images, to determine if a threshold change has occurred from a first image to a next image; and an image data compression module stored on the memory that, when executed by the processor, causes the processor to compress the image data, when the processor determines that the threshold change has not occurred from the first image to the next image, by deleting either first image data associated with the first image, or next image data associated with the next image, from the image data.

2. The vehicle in-cabin imaging device as in claim 1, wherein, when the processor determines that the threshold change has not occurred from the first image to the next image, a time range is associated with first image data or the next image data that is not deleted.

3. The vehicle in-cabin imaging device as in claim 2, wherein the time range is based on a first image time stamp.

4. The vehicle in-cabin imaging device as in claim 2, wherein the time range is based on a next image time stamp.

5. The vehicle in-cabin imaging device as in claim 1, wherein the image data is representative of a three-dimensional location of at least a portion of at least one occupant within the vehicle interior and an orientation of the portion of the at least one vehicle occupant.

6. The vehicle in-cabin imaging device as in claim 1, wherein the image data is representative of at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

7. The vehicle in-cabin imaging device as in claim 1, wherein the image data is representative of an image feature associated with at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

8. A computer-implemented method for automatically compressing image data that is representative of a series of images of an interior of a vehicle, the method comprising:

receiving, at a processor and in response to the processor executing a vehicle interior device data module, at least one of: location data or orientation data from at least one vehicle in-cabin imaging device sensor, wherein the location data is indicative of a location of the vehicle in-cabin imaging device relative to the vehicle occupant within the series of time-stamped digital images and the orientation data is indicative of an orientation of the vehicle in-cabin imaging device relative to the vehicle occupant within the series of time-stamped digital images, and wherein the processor determines at least one of: a location of the vehicle in-cabin imaging device based on the location data irrespective of a current location of the vehicle in-cabin imaging device within the vehicle interior or an orientation of the vehicle in-cabin imaging device based on the orientation data irrespective of a current orientation of the vehicle in-cabin imaging device within the vehicle interior;

receiving, at the processor and in response to the processor executing an image data receiving module, image data, wherein the image data is representative of a series of time-stamped digital images;

comparing, at the processor and in response to the processor executing an image comparison module, at least two sequential images, of the series of time-stamped digital images, to determine if a threshold change has occurred from a first image to a next image; and compressing, at the processor and in response to the processor executing an image data compression module, the image data, when the processor determines that the threshold change has not occurred from the first image to the next image, by deleting either first image data associated with the first image, or next image data associated with the next image, from the image data.

9. The method of claim 8, wherein the image data is representative of an image feature that is associated with at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

10. The method of claim 8, wherein the image data is representative of at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

11. The method of claim 8, wherein the image data is representative of a three-dimensional location of at least one vehicle occupant within the vehicle interior.

12. The method of claim 8, wherein the image data is representative of an orientation of at least a portion of at least one vehicle occupant within the vehicle interior.

13. The method of claim 8, wherein the image data is representative of a three-dimensional location of at least a portion of at least one occupant within the vehicle interior and an orientation of the portion of the at least one vehicle occupant.

14. A non-transitory computer-readable medium storing computer-readable instruction that, when executed by a processor, cause the processor to automatically compress image data associated with a series of images of an interior of a vehicle, the non-transitory computer-readable medium comprising:

a vehicle interior device data module that, when executed by the processor, causes the processor to receive at least one of: location data or orientation data from at least one vehicle in-cabin imaging device sensor, wherein the location data is indicative of a location of the vehicle in-cabin imaging device relative to the vehicle occupant within the series of time-stamped digital images and the orientation data is indicative of an orientation of the vehicle in-cabin imaging device relative to the vehicle occupant within the series of time-stamped digital images, and wherein the processor determines at least one of: a location of the vehicle in-cabin imaging device based on the location data irrespective of a current location of the vehicle in-cabin imaging device within the vehicle interior or an orientation of the vehicle in-cabin imaging device based on the orientation data irrespective of a current orientation of the vehicle in-cabin imaging device within the vehicle interior;

an image data receiving module that, when executed by the processor, causes the processor to receive image data, wherein the image data is representative of a series of time-stamped digital images;

an image comparison module that, when executed by the processor, causes the processor to compare at least two sequential images, of the series of time-stamped digital images, to determine if a threshold change has occurred from a first image to a next image; and an image data compression module that, when executed by the processor, causes the processor to compress the image data, when the processor determines that the threshold change has not occurred from the first image to the next image, by deleting either first image data associated with the first image, or next image data associated with the next image, from the image data.

15. The non-transitory computer-readable medium of claim 14, wherein the image data is representative of a three-dimensional location of at least a portion of at least one occupant within the vehicle interior and an orientation of the portion of the at least one vehicle occupant.

16. The non-transitory computer-readable medium of claim 14, wherein the image data is representative of an orientation of at least a portion of at least one vehicle occupant within the vehicle interior.

17. The non-transitory computer-readable medium of claim 14, wherein the image data is representative of a three-dimensional location of at least one vehicle occupant within the vehicle interior.

18. The non-transitory computer-readable medium of claim 14, wherein the image data is representative of at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

19. The non-transitory computer-readable medium of claim 14, wherein the image data is representative of an image feature associated with at least one of: a vehicle occupant head location/orientation, a vehicle occupant hand location/orientation, a vehicle occupant arm location/orientation, a vehicle occupant elbow location/orientation, a vehicle occupant torso location/orientation, a seat belt location, a cellular telephone location, a vehicle occupant eye location/orientation, or a vehicle seat location/orientation.

20. The non-transitory computer-readable medium of claim 14, wherein the image data is received from at least one sensor selected from: at least one digital image sensor, at least one ultra-sonic sensor, at least one radar-sensor, at least one infrared light sensor, or at least one laser light sensor.

* * * * *